(12) United States Patent
Weng et al.

(10) Patent No.: US 10,471,814 B1
(45) Date of Patent: Nov. 12, 2019

(54) TURNOVER ASSEMBLY OF PICKUP TRUCK CARRIAGE COVER

(71) Applicant: Ningbo Diroan Auto Accessories Co., Ltd., Cixi, Zhejiang (CN)

(72) Inventors: Rongjie Weng, Zhejiang (CN); Fangliang Weng, Zhejiang (CN)

(73) Assignee: NINGBO DIROAN AUTO ACCESSORIES CO., LTD., Cixi (CN)

( * ) Notice: Subject to any disclaimer, the term of this patent is extended or adjusted under 35 U.S.C. 154(b) by 0 days.

(21) Appl. No.: 16/540,632

(22) Filed: Aug. 14, 2019

(30) Foreign Application Priority Data

May 28, 2019 (CN) ..................... 2019 2 0786017 U

(51) Int. Cl.
*B60P 7/02* (2006.01)
*B60J 7/14* (2006.01)

(52) U.S. Cl.
CPC .................. *B60J 7/141* (2013.01); *B60P 7/02* (2013.01)

(58) Field of Classification Search
CPC ... C08F 10/00; B24B 9/04; B24B 5/44; B24B 29/005; B24B 41/06; A61M 2230/005
See application file for complete search history.

(56) References Cited

U.S. PATENT DOCUMENTS

| | | | | |
|---|---|---|---|---|
| 5,613,541 | A * | 3/1997 | Bradbury | B60J 5/14 160/231.2 |
| 5,636,893 | A * | 6/1997 | Wheatley | B60J 7/141 16/354 |
| 7,334,830 | B2 | 2/2008 | Weldy | |
| 9,004,571 | B1 * | 4/2015 | Bernardo | B60J 7/141 296/100.03 |
| 9,039,066 | B1 * | 5/2015 | Yue | B60P 7/02 296/100.09 |
| 9,211,834 | B2 | 12/2015 | Facchinello et al. | |
| 9,482,039 | B1 * | 11/2016 | Xu | E05D 5/14 |
| 10,384,522 | B2 * | 8/2019 | Yilma | B60J 7/141 |
| 10,414,257 | B2 * | 9/2019 | Facchinello | B62D 33/04 |

(Continued)

FOREIGN PATENT DOCUMENTS

CN 201534517 U 7/2010

*Primary Examiner* — Kiran B Patel
(74) *Attorney, Agent, or Firm* — Brinks Gilson & Lione

(57) ABSTRACT

The present disclosure discloses a turnover assembly of a pickup truck carriage cover. The turnover assembly includes a main turnover component and two auxiliary turnover components installed on two sides of the main turnover component in a turnover manner. The main turnover component includes a transverse plate, a vertical plate, and two L-shaped supporting plates symmetrically connected to the vertical plate. The auxiliary turnover component includes an installation part and a turnover part matching the main turnover component. The turnover part includes a turnover shaft matching a turnover slot hole, a vertical limit plate disposed at a bottom of the turnover shaft, and an arc connecting plate connecting the vertical limit plate and an installation frame. The turnover assembly implements a turnover connection between components through matching between the turnover slot hole and the turnover shaft, and matching between a guiding cambered surface and an arc surface.

10 Claims, 15 Drawing Sheets

(56) References Cited

U.S. PATENT DOCUMENTS

| | | | | |
|---|---|---|---|---|
| 2001/0035664 | A1* | 11/2001 | Steffens | B60J 7/141 |
| | | | | 296/100.09 |
| 2007/0210609 | A1* | 9/2007 | Maimin | B60J 7/141 |
| | | | | 296/100.09 |
| 2008/0100088 | A1* | 5/2008 | Calder | B60J 7/141 |
| | | | | 296/100.09 |
| 2009/0146449 | A1* | 6/2009 | Steffens | B60J 7/141 |
| | | | | 296/100.07 |
| 2015/0054300 | A1* | 2/2015 | Shi | B60J 7/141 |
| | | | | 296/100.09 |
| 2015/0061315 | A1* | 3/2015 | Facchinello | B60P 7/02 |
| | | | | 296/100.07 |
| 2015/0165960 | A1* | 6/2015 | Yue | B60J 7/141 |
| | | | | 296/100.09 |
| 2016/0031305 | A1* | 2/2016 | Bernardo | B60J 7/085 |
| | | | | 296/100.03 |
| 2016/0200375 | A1* | 7/2016 | Kerr, III | B60J 7/141 |
| | | | | 296/100.07 |
| 2016/0200376 | A1* | 7/2016 | Kerr, III | B60P 7/02 |
| | | | | 296/100.07 |
| 2016/0340949 | A1* | 11/2016 | Xu | E05D 5/14 |
| 2017/0217294 | A1* | 8/2017 | Lutzka | B60J 7/141 |
| 2018/0147926 | A1* | 5/2018 | Shi | B60J 7/198 |
| 2018/0312046 | A1* | 11/2018 | Hutchens, III | B01J 37/0215 |
| 2019/0061498 | A1* | 2/2019 | DeLong | B60J 7/198 |
| 2019/0084391 | A1* | 3/2019 | Yilma | B25H 1/04 |
| 2019/0100088 | A1* | 4/2019 | Facchinello | B60J 7/14 |
| 2019/0105975 | A1* | 4/2019 | Yilma | B60J 7/141 |
| 2019/0118629 | A1* | 4/2019 | Spencer | B60J 7/04 |

* cited by examiner

TURNOVER ASSEMBLY OF PICKUP TRUCK CARRIAGE COVER

RELATED APPLICATION

This application claims priority to Chinese Patent Application No. 201920786017.2, filed with China National Intellectual Property Administration on May 28, 2019, which is incorporated herein by reference in its entirety.

BACKGROUND

Technical Field

The present disclosure relates to a pickup truck accessory, and in particular to a turnover assembly of a pickup truck carriage cover.

Related Art

A pickup truck has an open-type rear carriage that may be used to transport goods. When transporting goods in a bad weather, the pickup truck usually has a carriage cover installed on the top of the rear carriage to protect the goods to be transported. Currently, the carriage cover usually includes a plurality of juxtaposed cover plates, and neighboring cover plates are connected and matched through a hinge, so that the whole carriage cover can be stacked, so as to conveniently take and place the goods in the rear carriage of the pickup truck. However, a manner of connecting neighboring cover plates of the carriage cover through a hinge causes a relatively low structural strength. Therefore, at present, it is necessary to develop a turnover assembly of a pickup truck carriage cover with a relatively high structural strength.

The present disclosure describes a pickup truck carriage cover, solving one or more the above drawbacks.

SUMMARY

The present disclosure describes a turnover assembly of a pickup truck carriage cover, and the turnover assembly of the pickup truck carriage cover may enhance a connection strength between neighboring cover plates. The present disclosure may solve the previous drawbacks through the following technical solution.

A turnover assembly of a pickup truck carriage cover includes a main turnover component; and two auxiliary turnover components installed on two sides of the main turnover component in a turnover manner. The main turnover component includes a transverse plate, a vertical plate connected to a bottom center of the transverse plate and perpendicular to the transverse plate, and two L-shaped supporting plates symmetrically connected to the vertical plate. The main turnover component is provided with a turnover slot hole at a joint of the transverse plate and the vertical plate and is provided with a turnover opening on one side of the turnover slot hole far away from the joint of the transverse plate and the vertical plate. The transverse plate has a second limit surface connected to an upper edge of the turnover opening; the vertical plate has a first limit surface connected to a lower edge of the turnover opening; and the L-shaped supporting plate has a guiding cambered surface opposite to the turnover slot hole. One of the auxiliary turnover components includes an installation part configured for installing a cover plate and a turnover part matching the main turnover component. The turnover part includes a turnover shaft matching the turnover slot hole, a vertical limit plate disposed at a bottom of the turnover shaft, and an arc connecting plate connecting the vertical limit plate and an installation frame. The vertical limit plate matches the first limit surface and the second limit surface to restrict a turnover angle of the auxiliary turnover component; and the arc connecting plate has an arc surface that fits the guiding cambered surface.

By adopting the foregoing technical solution, the turnover assembly of a pickup truck carriage cover realizes a turnover connection relationship between the main turnover component and the auxiliary turnover components through matching between the turnover shaft and the turnover slot hole and matching between the guiding cambered surface and the arc surface, and the turnover assembly has a relatively high structural strength, and is not easy to be damaged, thereby ensuring structural stability of the pickup truck carriage cover with the turnover assembly, and reducing a probability of damage to the pickup truck carriage cover.

When the vertical limit plate of the auxiliary turnover component fits the first limit surface, the auxiliary turnover component is at a maximum downward turnover angle, and the auxiliary turnover component is in a closed state; when the vertical limit plate of the auxiliary turnover component fits the second limit surface, the auxiliary turnover component is at a maximum upward turnover angle, and the auxiliary turnover component is in an open state.

A further setting of the present disclosure is that, the first limit surface is perpendicular to the second limit surface.

By adopting the foregoing technical solution, the second limit surface is perpendicular to the first limit surface, so that a turnover angle of the auxiliary turnover component is 90°. When the turnover assembly in the present disclosure is used, cover plates are installed on the two auxiliary turnover components, and the foregoing limitation on the turnover angle of the auxiliary turnover component is helpful for stacking the two cover plates.

A further setting of the present disclosure is that, the auxiliary turnover component has a supporting groove formed between the arc connecting plate and the installation part, and a shape of the supporting groove matches a shape of the L-shaped supporting plate.

By adopting the foregoing technical solution, the shape of the supporting groove matches the shape of the L-shaped supporting plate, which further improves compactness of the matching between the main turnover component and the auxiliary turnover component, and also enhances a connection strength between the main turnover component and the auxiliary turnover component when the auxiliary turnover component is in the closed state.

A further setting of the present disclosure is that, a top of the arc connecting plate is provided with a sealing groove along a length direction of the arc connecting plate on one side facing the transverse plate, and a sealing strip abutting against the transverse plate is installed in the sealing groove.

By adopting the foregoing technical solution, the sealing strip on the auxiliary turnover component abuts against the transverse plate of the main turnover component, thereby improving waterproof performance of the turnover assembly of the pickup truck carriage cover, reducing a probability that rainwater enters a bottom surface of the turnover assembly from a top surface of the turnover assembly through a gap between the main turnover component and the auxiliary turnover component, and improving a protection capability of the pickup truck carriage cover with the turnover assembly for goods to be transported.

A further setting of the present disclosure is that, the transverse plate is provided with a sealing bevel for the sealing strip to abut on each of both sides of a top surface of the transverse plate along a length direction of the transverse plate, and the sealing bevel is disposed obliquely downward along a direction close to the sealing strip.

By adopting the foregoing technical solution, when the auxiliary turnover component is in the closed state, the sealing strip abuts against the sealing bevel of the transverse plate and has relative deformation, thereby ensuring a waterproof capability of the turnover assembly. At the same time, a setting of the sealing bevel makes the sealing strip be always located above the transverse plate throughout, which helps reduce a probability of damage to the sealing strip when the auxiliary turnover component is rotated, that is, helps prolong a service life of the sealing strip in the turnover assembly.

A further setting of the present disclosure is that, a cross section of the sealing groove is T-shaped, and the sealing strip has a T-shaped installation part matching the sealing groove and a sealing part abutting against the transverse plate.

By adopting the foregoing technical solution, a restriction on structures of the sealing strip and the sealing groove can ensure an installation strength of the sealing strip on the auxiliary turnover component, and reduce a probability that the sealing strip is divorced from the sealing groove.

A further setting of the present disclosure is that, when the two auxiliary turnover components are both folded to a top of the main turnover component and the vertical limit plates of the two auxiliary turnover components fit the corresponding second limit surfaces, there is a folding gap between the two opposite auxiliary turnover components.

By adopting the foregoing technical solution, a setting of the folding gap can prevent the two cover plates installed on the turnover assembly from colliding, and reduce a probability of damage to the cover plates installed on the two auxiliary turnover components.

A further setting of the present disclosure is that, the installation part has an installation slot for installing the cover plate, the installation part is symmetrically provided with clamping convex parts on two inner walls of the installation slot, and the clamping convex parts are arranged along a length direction of the installation slot.

By adopting the foregoing technical solution, the cover plate is installed in the installation slot of the installation part, and the clamping convex parts of the installation slot can enhance an installation strength of the cover plate installed on the installation part, and reduce a probability that the cover plate falls off from the auxiliary turnover component.

A further setting of the present disclosure is that, the vertical plate has a structural groove disposed along a length direction of the vertical plate, and the vertical plate is provided with a first reinforcing plate that is in the structural groove and that connects a left inner wall and a right inner wall of the structural groove.

By adopting the foregoing technical solution, a setting of the structural groove can reduce a weight of the vertical plate, thereby making a weight of the turnover assembly of the pickup truck carriage cover lighter. At the same time, a setting of the first reinforcing plate can ensure a structural strength of the vertical plate, and compared with a solid vertical plate, the structural strength of the vertical plate with the structural groove and the first reinforcing plate is higher.

A further setting of the present disclosure is that, the vertical plate has a structural groove disposed along a length direction of the vertical plate, and the vertical plate is provided with a second reinforcing plate connecting to an inner bottom surface of the structural groove on each of a left inner wall and a right inner wall of the structural groove.

By adopting the foregoing technical solution, a setting of the structural groove can reduce the weight of the vertical plate, thereby making the weight of the turnover assembly of the pickup truck carriage cover lighter. At the same time, a setting of the two second reinforcing plates can improve the structural strength of the vertical plate.

In conclusion, the present disclosure may have the following beneficial effects:

1. A turnover assembly of a pickup truck carriage cover includes a main turnover component and two auxiliary turnover components, the main turnover component and the auxiliary turnover components implement a turnover connection between each other through matching between a turnover slot hole and a turnover shaft, and matching between a guiding cambered surface and an arc surface, and a structural strength of the turnover assembly is relatively high, which enhances a connection strength between neighboring cover plates.

2. When the two auxiliary turnover components are both in an open state, there is a folding gap between the neighboring auxiliary turnover components, which can reduce a probability of damage to the auxiliary turnover components during turnover.

3. A setting of a sealing strip on the auxiliary turnover component can improve a waterproof effect of the turnover assembly of the pickup truck carriage cover, and a service life of the sealing strip can be prolonged through matching between the sealing strip and a sealing bevel of a transverse plate.

Figure 1:
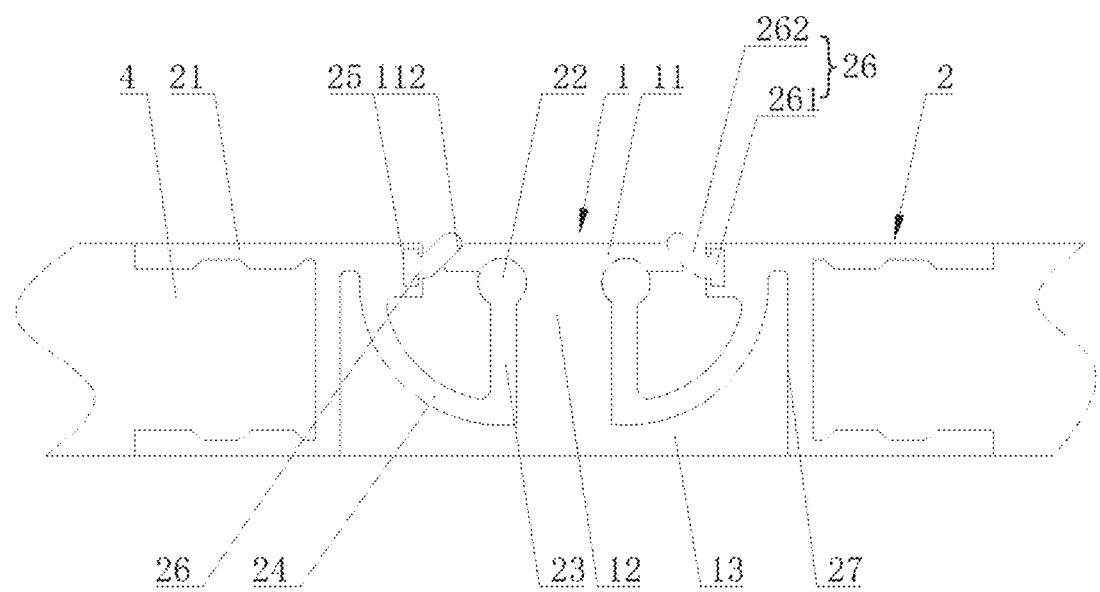
FIG. 1 is a schematic structural diagram of a turnover assembly of a pickup truck carriage cover when two auxiliary turnover components are in a closed state according to Embodiment 1.

In the figures:
1. Main turnover component;
11. Transverse plate;
111. Second limit surface;
112. Sealing bevel;
12. Vertical plate;
121. First limit surface;
122. Structural groove;
123. First reinforcing plate;
123a. First U-shaped plate;
123b. First connecting plate;
124. Second reinforcing plate;
124a. Second U-shaped plate;
124b. Second connecting plate;
124c. Third connecting plate;
13. L-shaped supporting plate;
131. Guiding cambered surface;
14. Turnover slot hole;
141. Turnover opening;
2. Auxiliary turnover component;
21. Installation part;
211. Installation slot;
212. Clamping convex part;
22. Turnover shaft;
23. Vertical limit plate;
24. Arc connecting plate;
241. Arc surface;
25. Sealing groove;
26. Sealing strip;
261. T-shaped installation part;
262. Sealing part;
27. Supporting groove;
3. Folding gap;
4. Cover plate.

DETAILED DESCRIPTION

The invention will now be described in detail hereinafter with reference to the accompanied drawings, which form a part of the present disclosure, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter includes combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 9A:
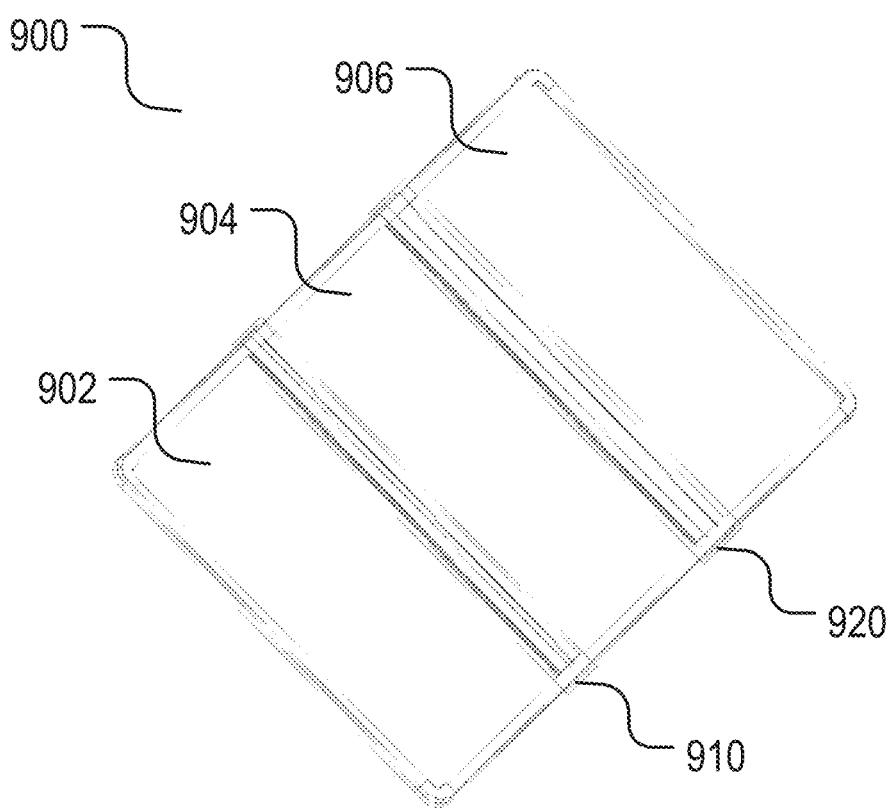
FIGS. 9A-9E show embodiments of a pickup truck carriage cover.

The present disclosure describes a turnover assembly for pickup truck carriage cover. FIG. 9A shows a pickup truck carriage cover 900. The pickup truck carriage cover may include two or more sections.

For example, referring to FIG. 9A, the pickup truck carriage cover 900 may include three sections/cover plates: a first section or a first cover plate 902, a second section or a second cover plate 904, and a third section or a third cover plate 906. The first section 902 may be a section covering a rear portion of the pickup truck carriage, and the third section 906 may be a section covering a front portion of the pickup truck carriage. Here, the "rear" may refer to further away from a driver of the pickup truck, and the "front" may refer to closer to the driver of the pickup truck.

Referring to FIG. 9A, the first section 902 and the second section 904 may be connected by a first turnover assembly 910, and the second section 904 and the third section 906 may be connected by a second turnover assembly 920. The first turnover assembly 910 may be shorter in length than the second turnover assembly 920. Here, "length" may refer to a dimension of the turnover assemblies along a rear-front axis of the pickup truck. In another implementation, the first turnover assembly may be longer than or have a same length as the second turnover assembly.

Figure 9B:
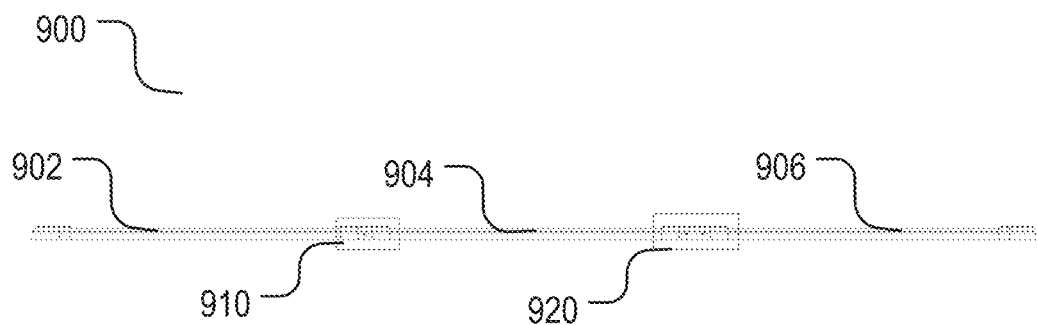

FIG. 9B shows a side view of the turnover assembly 900 of the pickup truck carriage cover.

Figure 9C:
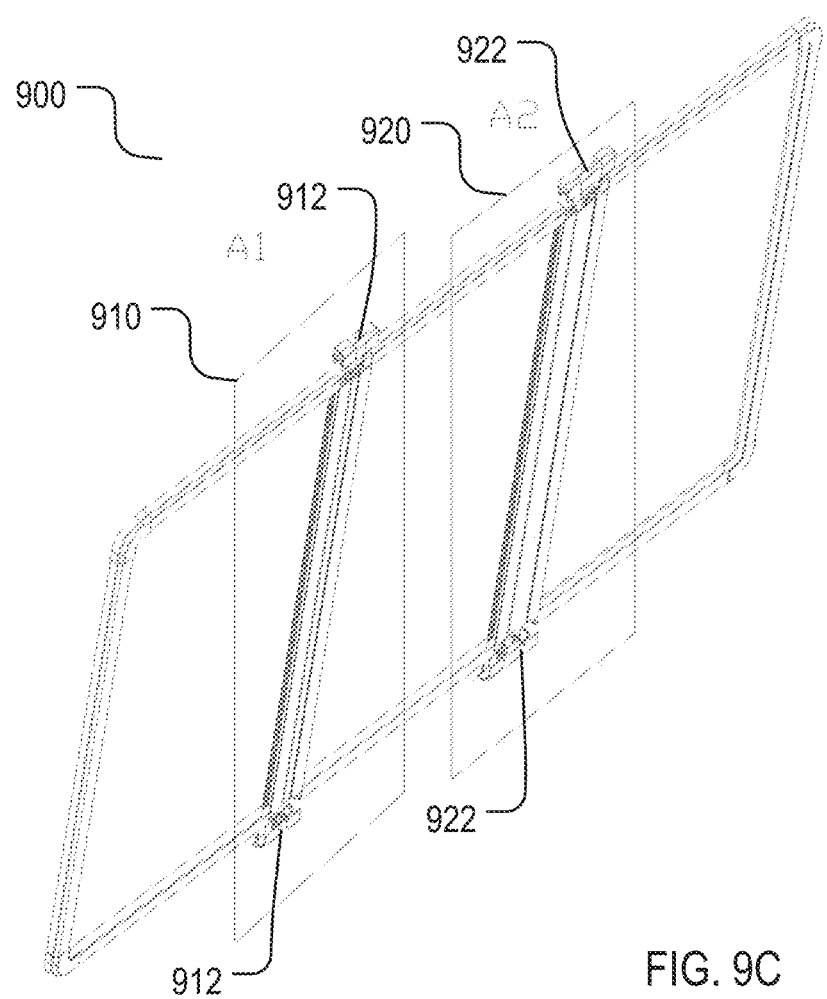

Referring to FIG. 9C, the first turnover assembly 910 may include two side covers 912 disposed at each end of the first turnover assembly 910; the second turnover assembly 920 may include two side covers 922 disposed at each end of the second turnover assembly 920. The side covers may be made of plastic, aluminum, aluminum alloy, or steel.

Figure 9D:
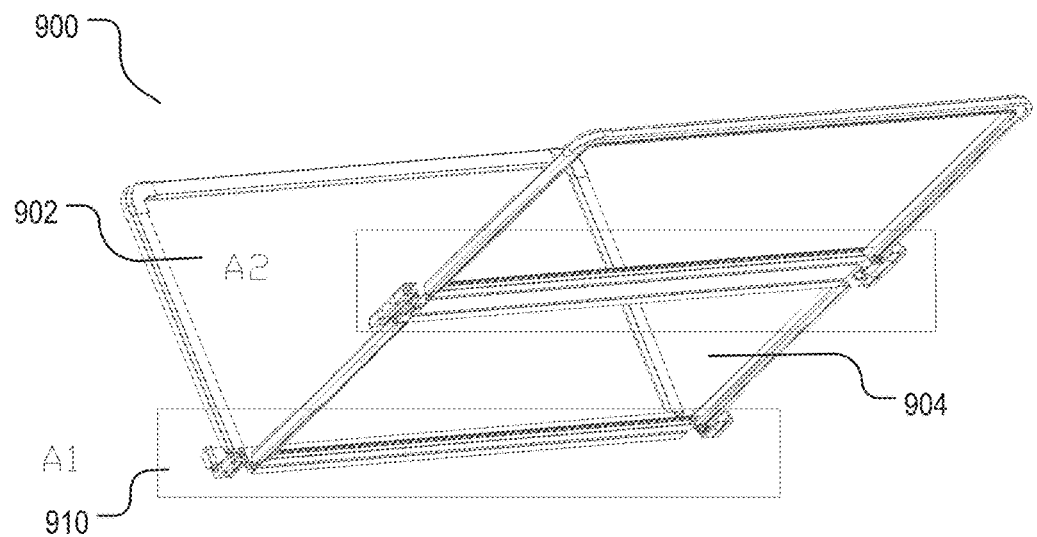

Referring to FIG. 9D, the first section 902 may be turned about 90 degrees relative to the second/third sections, wherein one portion of the first turnover assembly 910 may be an open or partial open state. Here, "about" may refer to a range of values ±10 degrees.

Figure 9E:
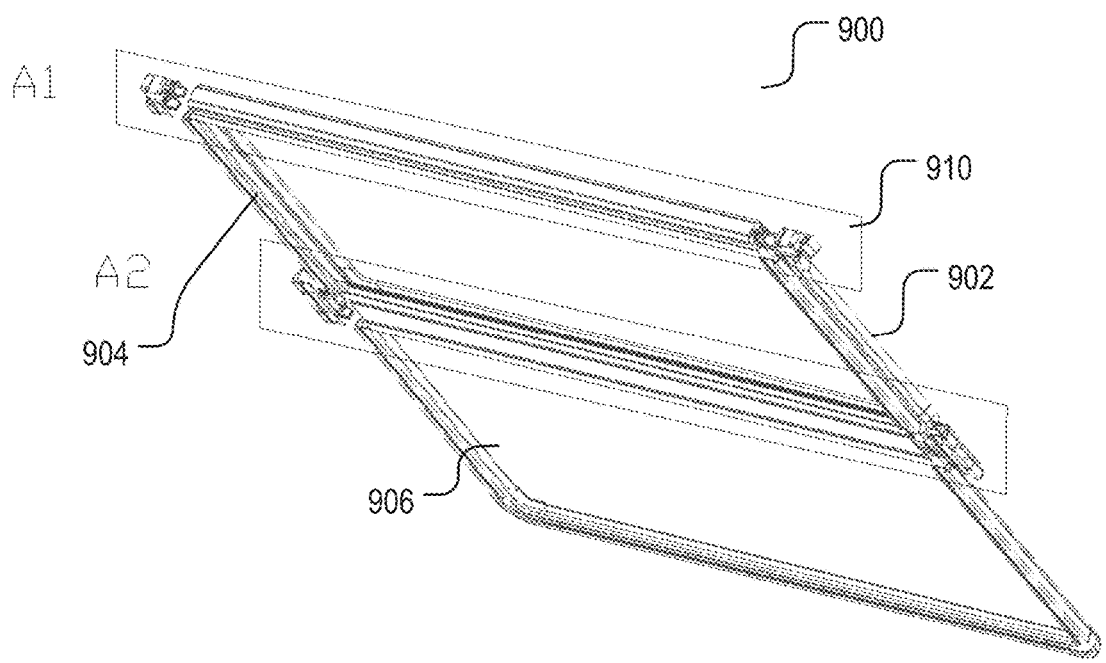

Referring to FIG. 9E, the first section 902 may be turned about 180 degrees relative to the second/third sections, wherein two portions of the first turnover assembly 910 may be in an open state, so that the first section 902 may completely fold over the second section 904.

The present disclosure describes a few embodiments of turnover assemblies as below.

Embodiment 1

Referring to FIG. 1, a turnover assembly of a pickup truck carriage cover includes a main turnover component 1 and auxiliary turnover components 2 installed on two sides of the main turnover component 1 in a turnover manner. The turnover assembly may include all or only a portion of the components shown in FIGS. 1-3.

In one implementation, a height of the main turnover component 1 is equal to a height of the auxiliary turnover component 2.

Figure 2:
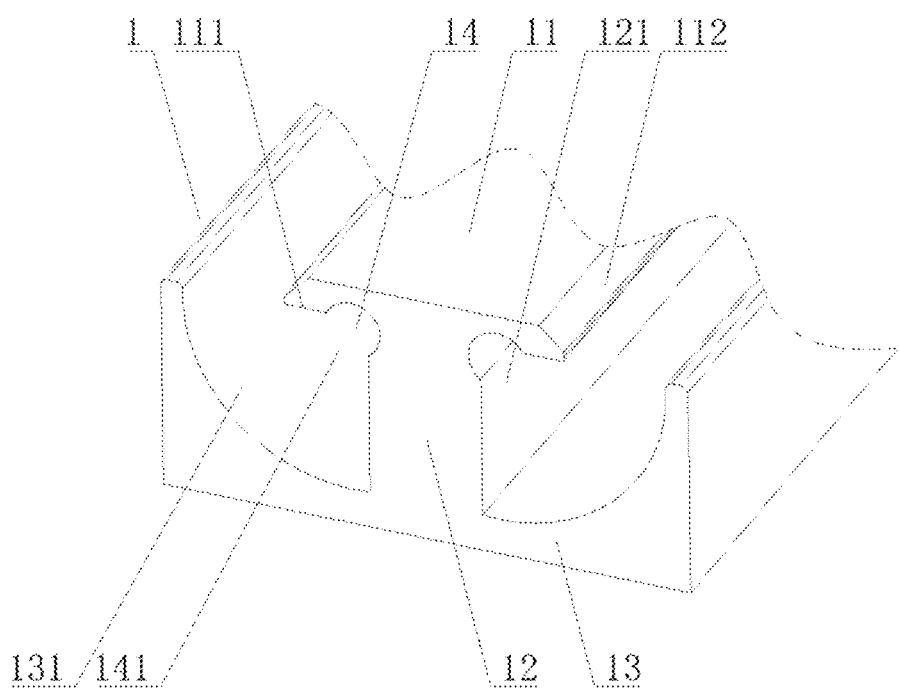
FIG. 2 is a schematic structural diagram of a main turnover component according to Embodiment 1.

Referring to FIG. 2, the main turnover component 1 includes a transverse plate 11, a vertical plate 12 connected to a bottom center of the transverse plate 11 and perpendicular to the transverse plate 11, and two L-shaped supporting plates 13 symmetrically connected to the vertical plate 12.

The main turnover component 1 is provided with a turnover slot hole 14 at a joint of the transverse plate 11 and the vertical plate 12 and is provided with a turnover opening 141 on one side of the turnover slot hole 14 far away from the joint of the transverse plate 11 and the vertical plate 12. The vertical plate 12 has a first limit surface 121 connected to a lower edge of the turnover opening 141, and the transverse plate 11 has a second limit surface 111 connected to an upper edge of the turnover opening 141. In this embodiment, the first limit surface 121 is perpendicular to the second limit surface 111.

The L-shaped supporting plate 13 has a guiding cambered surface 131 opposite to the turnover slot hole 14. The guiding cambered surface 131 is an arc surface, and a circumferential angle of the guiding cambered surface 131 is 90°. An opening for the auxiliary turnover component 2 to stretch out is formed between the L-shaped supporting plate 13 and the transverse plate 11.

Figure 3:
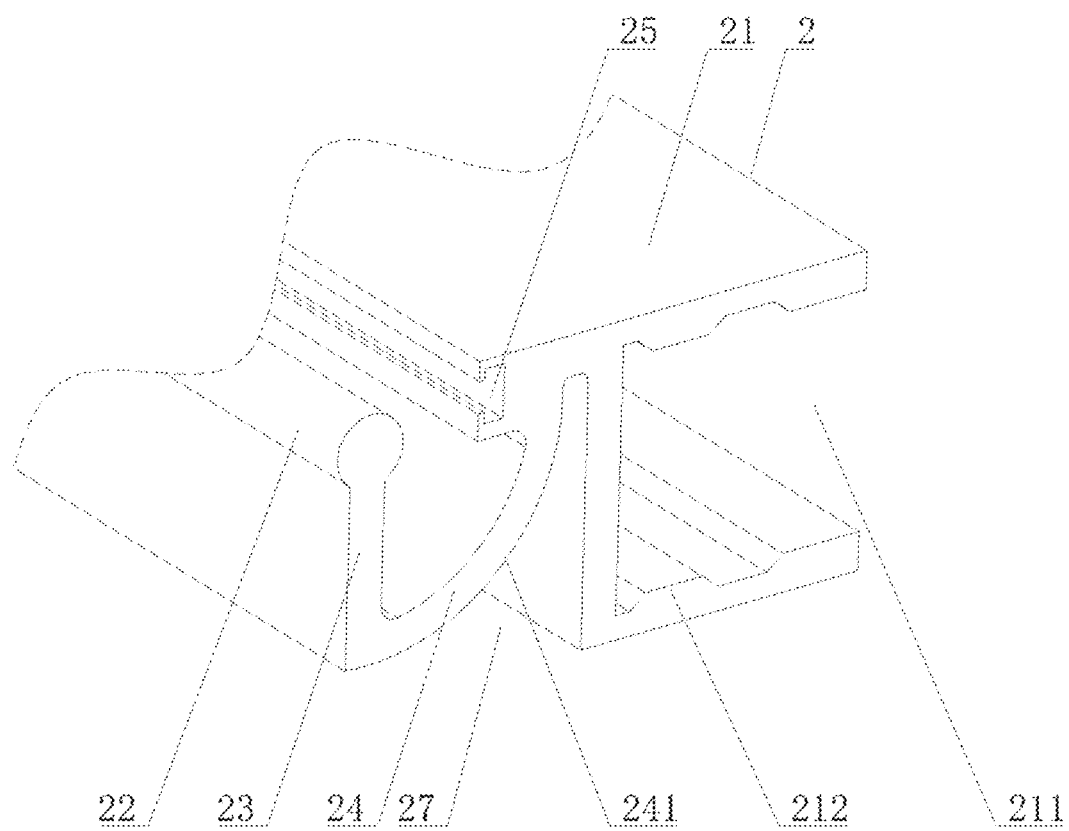
FIG. 3 is a schematic structural diagram of an auxiliary turnover component according to Embodiment 1.

Referring to FIGS. 1-3, the auxiliary turnover component 2 includes an installation part 21 for installing a cover plate 4 and a turnover part matching the main turnover component 1. The installation part 21 has an installation slot 211 for installing the cover plate 4. The installation part 21 is symmetrically provided with clamping convex parts 212 on two inner walls of the installation slot 211, and the clamping convex parts 212 are arranged along a length direction of the installation slot 211.

The turnover part is connected to a top of the installation part 21, and the turnover part includes a turnover shaft 22 matching the turnover slot hole 14, a vertical limit plate 23 disposed at a bottom of the turnover shaft 22, and an arc connecting plate 24 connecting the vertical limit plate 23 and an installation frame. The vertical limit plate 23 can match the first limit surface 121 and the second limit surface 111 to restrict a turnover angle of the auxiliary turnover component 2, and because the first limit surface 121 is perpendicular to the second limit surface 111, an angle by which the auxiliary turnover component 2 can turn over relative to the main turnover component 1 is 90°.

Referring to FIG. 1, when the vertical limit plate 23 of the auxiliary turnover component 2 fits the first limit surface 121, the auxiliary turnover component 2 is at a maximum downward turnover angle, and the auxiliary turnover component 2 is in a closed state.

Figure 4:
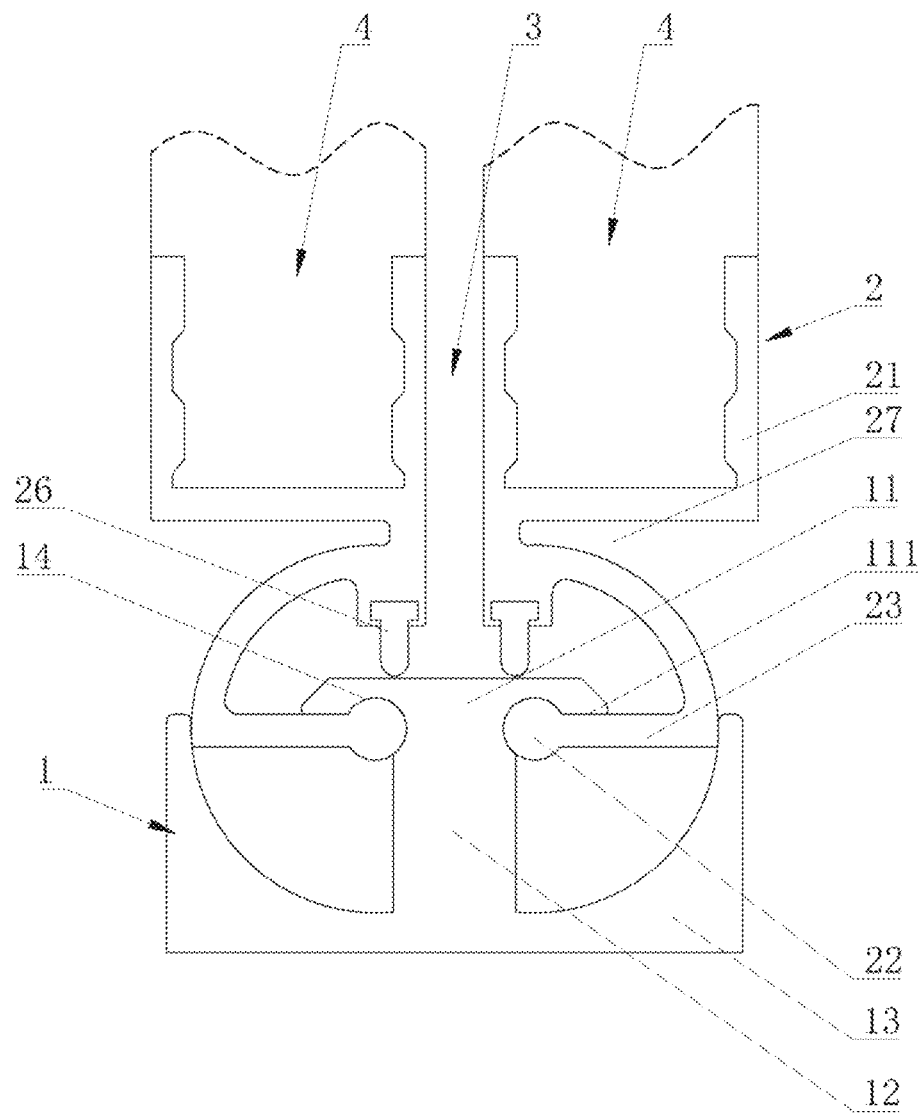
FIG. 4 is a schematic structural diagram of a turnover assembly of a pickup truck carriage cover when two auxiliary turnover components are in an open state according to Embodiment 1.

Referring to FIG. 4, when the vertical limit plate 23 of the auxiliary turnover component 2 fits the second limit surface 111, the auxiliary turnover component 2 is at a maximum upward turnover angle, and the auxiliary turnover component 2 is in an open state.

When the two auxiliary turnover components 2 in the turnover assembly are both in the open state, there is a folding gap 3 between the two opposite auxiliary turnover components 2. A width of the folding gap 3 may be a pre-determined value. In one implementation, a width of the folding gap 3 may be 3 mm.

Referring to FIG. 2 and FIG. 3, the arc connecting plate 24 has an arc surface 241 that fits the guiding cambered surface 131, and in a process in which the auxiliary turnover component 2 slips relative to the main turnover component 1, the arc surface 241 always fits the guiding cambered surface 131.

Referring to FIG. 1 and FIG. 3, a top of the arc connecting plate 24 is provided with a sealing groove 25 along a length direction of the arc connecting plate 24 on one side facing the transverse plate 11, and a sealing strip 26 abutting against the transverse plate 11 is installed in the sealing groove 25. A cross section of the sealing groove 25 may be T-shaped. In one implementation, the sealing strip 26 has a T-shaped installation part 261 matching the sealing groove 25 and a sealing part 262 abutting against the transverse plate 11.

Referring to FIG. 1 and FIG. 2, the transverse plate 11 is provided with a sealing bevel 112 for the sealing part 262 of the sealing strip 26 to abut on each of both sides of a top surface of the transverse plate 11 along a length direction of the transverse plate 11, and the sealing bevel 112 is disposed obliquely downward along a direction close to the sealing strip 26. When the auxiliary turnover component 2 is in the closed state, the sealing part 262 abuts against the sealing bevel 112 of the transverse plate 11 and has relative deformation, thereby ensuring a waterproof capability of the turnover assembly. Because a setting of the sealing bevel 112 makes the sealing strip 26 be always located above the transverse plate 11, a probability of damage to the sealing part 262 of the sealing strip 26 when matching the transverse plate 11 is reduced, thereby helping prolong a service life of the sealing strip 26 in the turnover assembly.

A supporting groove 27 is further formed between the turnover part and the installation part 21, and a shape of the supporting groove 27 matches a shape of the L-shaped supporting plate 13, so that when the auxiliary turnover component 2 is in the closed state, the L-shaped supporting plate of the main turnover component 1 is embedded in the supporting groove 27, which improves an integrity and a structural strength of the turnover assembly.

Referring to FIG. 1, when the pickup truck carriage cover is in a goods transportation state, the two auxiliary turnover components 2 of the turnover assembly are both in the closed state, so that an upper surface of the main turnover component 1, upper surfaces of the auxiliary turnover components 2, and the two cover plates 4 installed on the auxiliary turnover components 2 are all in a same plane.

Referring to FIG. 4, when the pickup truck carriage cover is in a goods pick-up state, the two auxiliary turnover components 2 of the turnover assembly are both in the open state. One auxiliary turnover component 2 is at an original position, the main turnover component 1 turns over by 90° relative to the fixed auxiliary turnover component 2, and the other auxiliary turnover component 2 turns over by 90° again relative to the main turnover component 1. Therefore, one cover plate 4 is in a fixed state, the other cover plate 4 is stacked above the fixed cover plate 4, and there is a gap between the two cover plates 4.

Embodiment 2

Compared with Embodiment 1, a structure of a vertical plate 12 in a main turnover component 1 may be different from that of the vertical plate 12 in Embodiment 1, and other structures in this embodiment may be the same as those in Embodiment 1.

Figure 5:
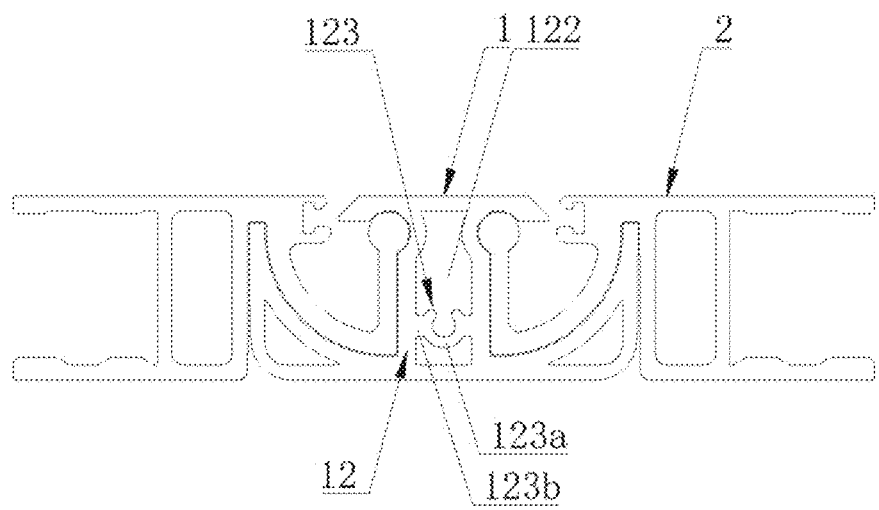
FIG. 5 is a schematic structural diagram of a turnover assembly of a pickup truck carriage cover when two auxiliary turnover components are in a closed state according to Embodiment 2.

Referring to FIG. 5, a vertical plate 12 of a main turnover component 1 is wider than the vertical plate 12 in Embodiment 1, and the vertical plate 12 has a structural groove 122 disposed along a length direction of the vertical plate 12. The vertical plate is provided with a first reinforcing plate 123 that is at a lower part of the structural groove 122 and that connects a left inner wall and a right inner wall of the structural groove 122. The first reinforcing plate 123 includes a first U-shaped plate 123a and first connecting plates 123b symmetrically disposed on both sides of the first U-shaped plate 123a, and the two first connecting plates 123b are respectively connected to a left inner wall and a right inner wall of the vertical plate 12.

Embodiment 3

Compared with the previous embodiments, a structure of a vertical plate in a main turnover component may be different from that of the vertical plate in Embodiment 2, other structures in this embodiment may be the same as those in Embodiment 2.

Figure 6:
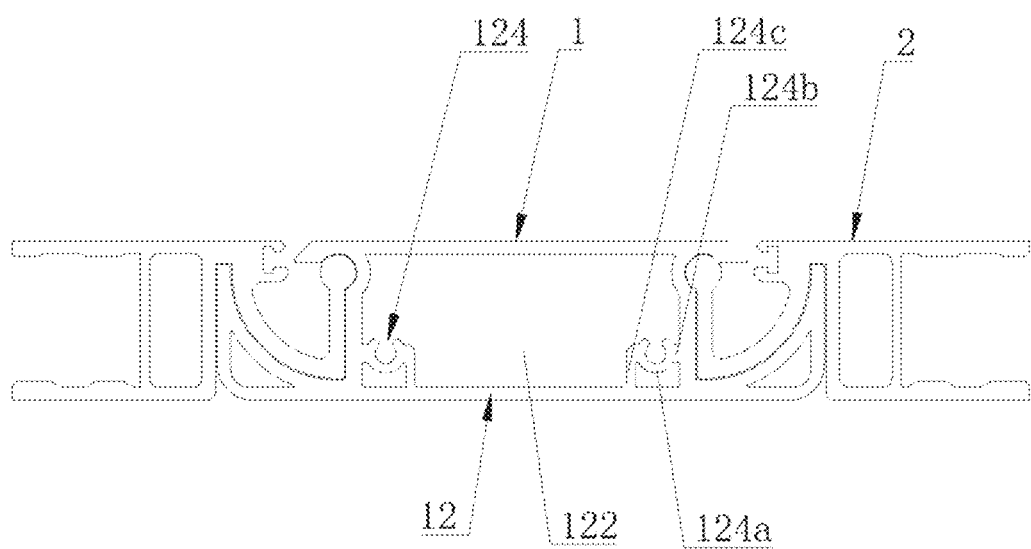
FIG. 6 is a schematic structural diagram of a turnover assembly of a pickup truck carriage cover when two auxiliary turnover components are in a closed state according to Embodiment 3.

Referring to FIG. 6, a vertical plate 12 of a main turnover component 1 is wider than the vertical plate 12 in Embodiment 2. The vertical plate 12 has a structural groove 122 disposed along a length direction of the vertical plate 12. The vertical plate 12 is provided with a second reinforcing plate 124 connecting to an inner bottom surface of the structural groove 122 on each of a left inner wall and a right inner wall of the structural groove 122. A cross section of the second reinforcing plate 124 is L-shaped, and the second reinforcing plate 124 includes a second U-shaped plate 124a, a second connecting plate 124b connecting the second U-shaped plate 124a and the left inner wall/right inner wall, and a third connecting plate 124c connecting the second U-shaped plate 124a and the inner bottom surface of the structural groove 122.

Embodiment 4

Figure 7A:
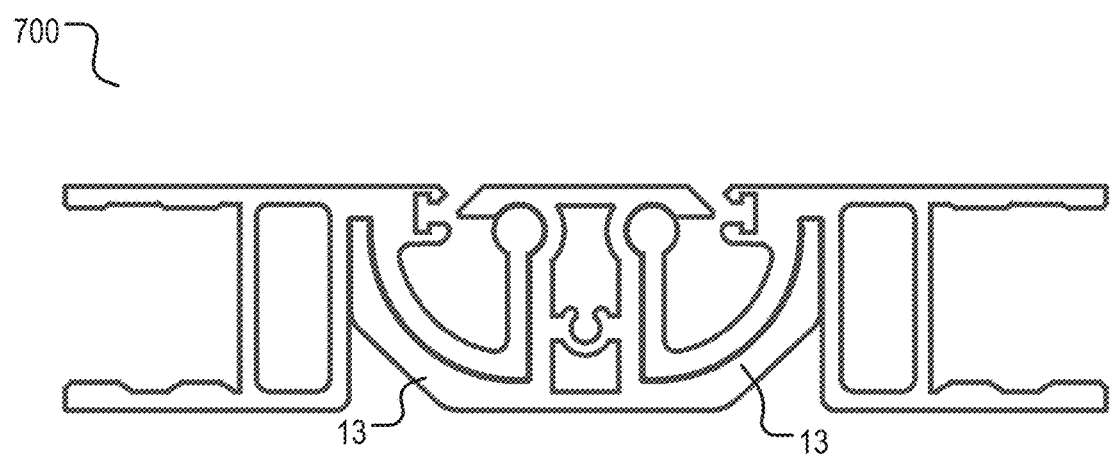
FIG. 7A shows another embodiment of a turnover assembly, which is in a closed state.
Figure 7B:
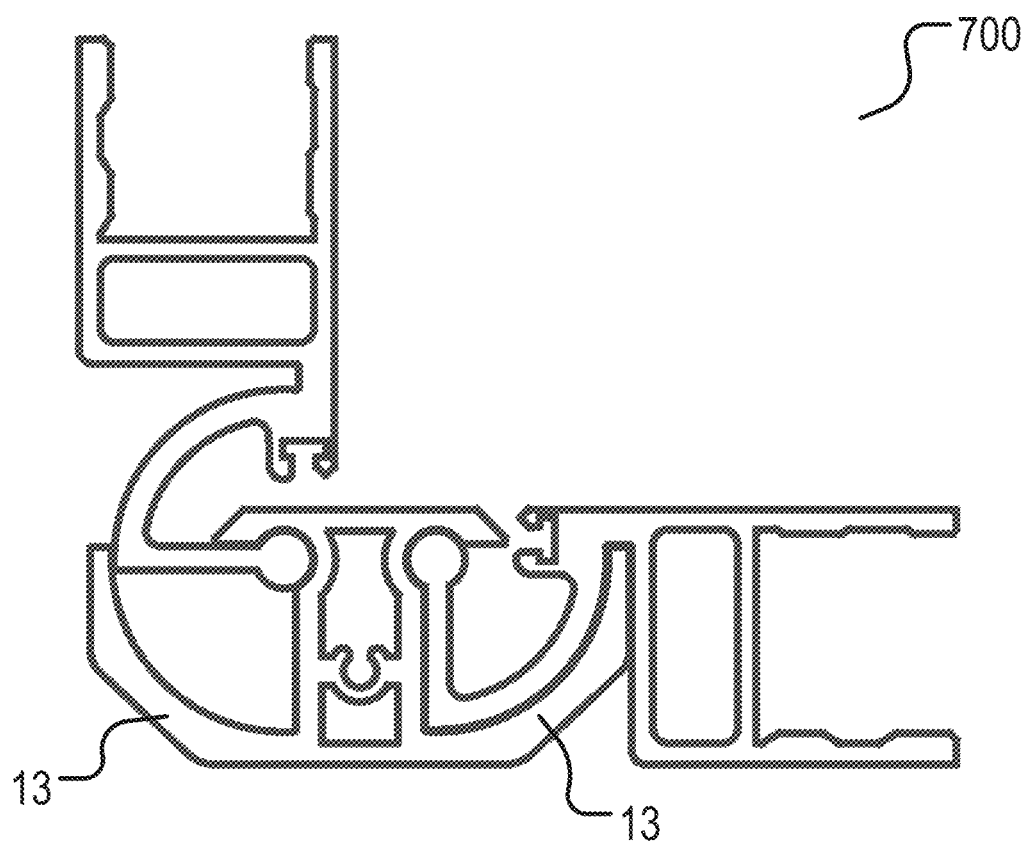
FIG. 7B shows another embodiment of a turnover assembly, which is in a half open state.
Figure 7C:
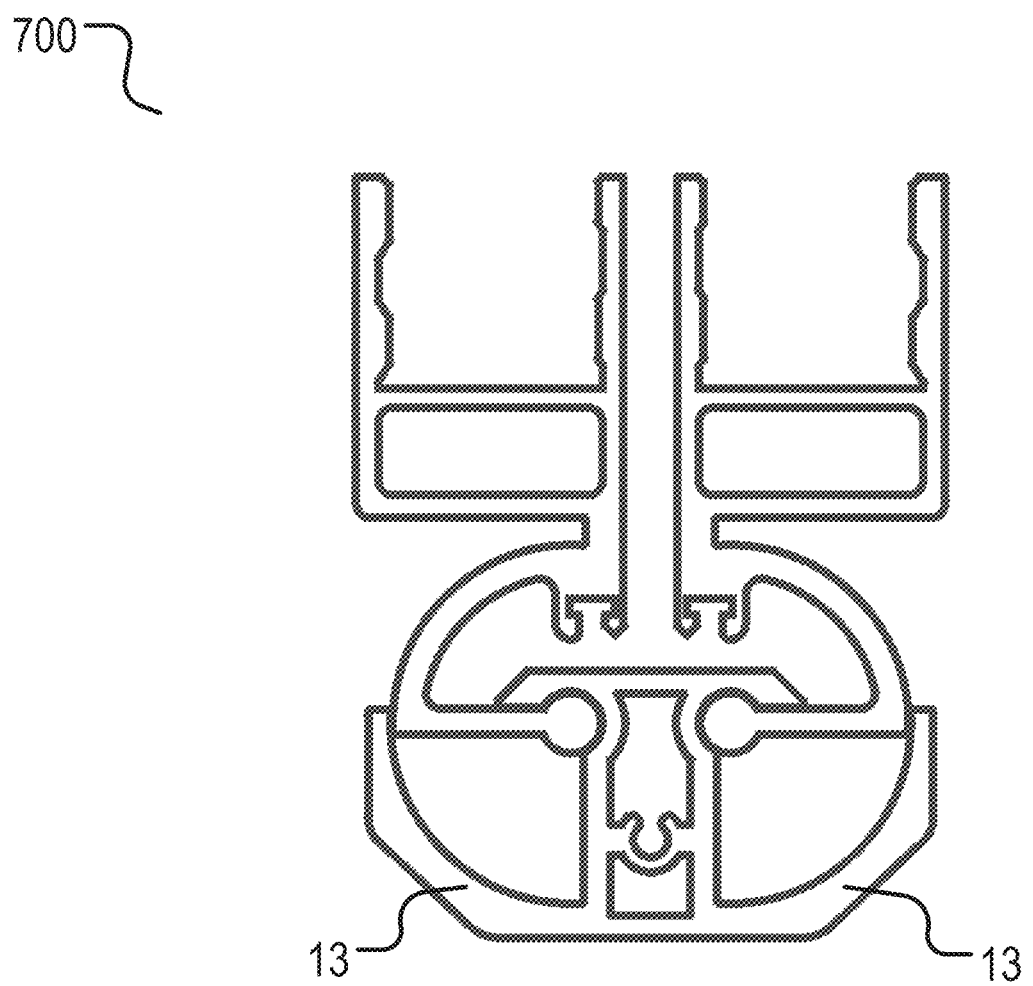
FIG. 7C shows another embodiment of a turnover assembly, which is in an open state.

The present disclosure describes another embodiment in FIGS. 7A-7C. Compared with the previous embodiments, an L-shaped supporting plate 13 of a main turnover component in FIGS. 7A-7C may be different from that of the L-shaped supporting plate in Embodiment 2.

FIG. 7A shows that a turnover assembly 700 is in a closed state.

FIG. 7B shows that a turnover assembly 700 is in a half open state.

FIG. 7C shows that a turnover assembly 700 is in an open state.

Embodiment 5

Figure 8A:
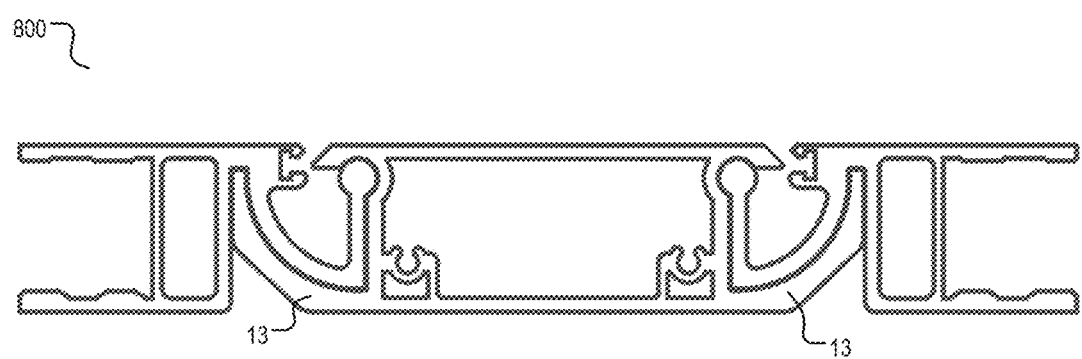
FIG. 8A shows another embodiment of a turnover assembly, which is in a closed state.
Figure 8B:
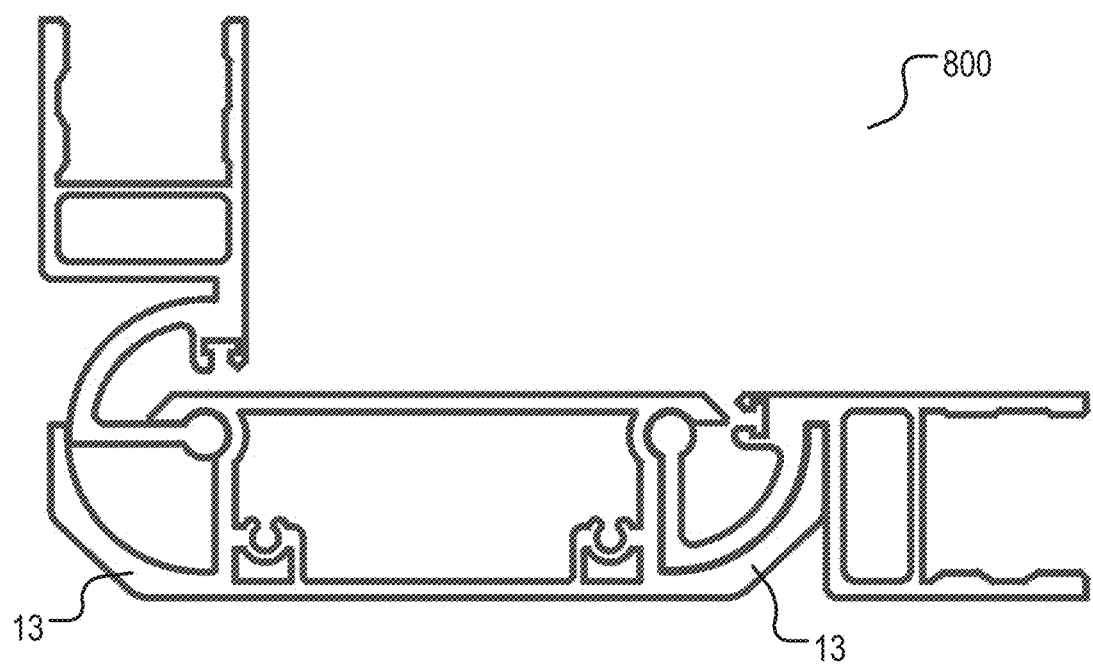
FIG. 8B shows another embodiment of a turnover assembly, which is in a half open state.
Figure 8C:
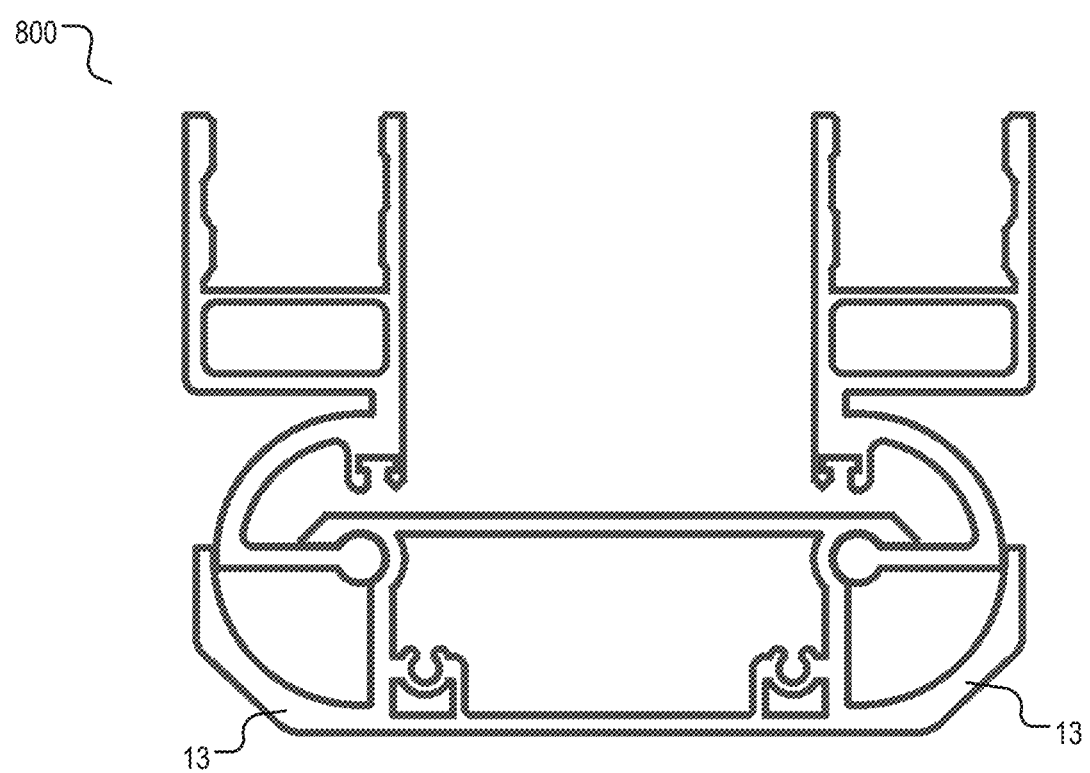
FIG. 8C shows another embodiment of a turnover assembly, which is in an open state.

The present disclosure describes another embodiment in FIGS. 8A-8C. Compared with the previous embodiments, an L-shaped supporting plate 13 of a main turnover component in FIGS. 8A-8C may be different from that of the L-shaped supporting plate in Embodiment 3.

FIG. 8A shows that a turnover assembly 800 is in a closed state.

FIG. 8B shows that a turnover assembly 800 is in a half open state.

FIG. 8C shows that a turnover assembly 800 is in an open state.

The specific embodiments are only an explanation of the present disclosure, and are not a limitation on the present disclosure. After reading this specification, a person skilled in the art may make modifications without creative contributions to the embodiments as required, but as long as falling within the scope of claims of the present disclosure, the modifications are protected by patent law.

What is claimed is:

1. A turnover assembly of a pickup truck carriage cover, comprising:
a main turnover component; and
two auxiliary turnover components installed on two sides of the main turnover component in a turnover manner, wherein:
the main turnover component comprises a transverse plate, a vertical plate connected to a bottom center of the transverse plate and perpendicular to the transverse plate, and two L-shaped supporting plates symmetrically connected to the vertical plate; the main turnover component is provided with a turnover slot hole at a joint of the transverse plate and the vertical plate and is provided with a turnover opening on one side of the turnover slot hole far away from the joint of the transverse plate and the vertical plate; the transverse plate has a second limit surface connected to an upper edge of the turnover opening; the vertical plate has a first limit surface connected to a lower edge of the turnover opening; and the L-shaped supporting plate has a guiding cambered surface opposite to the turnover slot hole, and
one of the auxiliary turnover components comprises an installation part configured for installing a cover plate and a turnover part matching the main turnover component; the turnover part comprises a turnover shaft matching the turnover slot hole, a vertical limit plate disposed at a bottom of the turnover shaft, and an arc connecting plate connecting the vertical limit plate and an installation frame; the vertical limit plate matches the first limit surface and the second limit surface to restrict a turnover angle of the auxiliary turnover component; and the arc connecting plate has an arc surface that fits the guiding cambered surface.

2. The turnover assembly according to claim 1, wherein the first limit surface is perpendicular to the second limit surface.

3. The turnover assembly according to claim 1, wherein one of the auxiliary turnover components has a supporting groove formed between the arc connecting plate and the installation part, and a shape of the supporting groove matches a shape of the L-shaped supporting plate.

4. The turnover assembly according to claim 1, wherein a top of the arc connecting plate is provided with a sealing groove along a length direction of the arc connecting plate on one side facing the transverse plate, and a sealing strip abutting against the transverse plate is installed in the sealing groove.

5. The turnover assembly according to claim 4, wherein the transverse plate is provided with a sealing bevel for the sealing strip to abut on each of both sides of a top surface of the transverse plate along a length direction of the transverse plate, and the sealing bevel is disposed obliquely downward along a direction close to the sealing strip.

6. The turnover assembly according to claim 5, wherein a cross section of the sealing groove is T-shaped, and the sealing strip has a T-shaped installation part matching the sealing groove and a sealing part abutting against the transverse plate.

7. The turnover assembly according to claim 1, wherein when the two auxiliary turnover components are both folded to a top of the main turnover component and the vertical limit plates of the two auxiliary turnover components fit a corresponding second limit surfaces, there is a folding gap between the two opposite auxiliary turnover components.

8. The turnover assembly according to claim 1, wherein the installation part has an installation slot for installing the cover plate, the installation part is symmetrically provided with clamping convex parts on two inner walls of the installation slot, and the clamping convex parts are arranged along a length direction of the installation slot.

9. The turnover assembly according to claim 1, wherein the vertical plate has a structural groove disposed along a length direction of the vertical plate, and the vertical plate is provided with a first reinforcing plate that is in the structural groove and that connects a left inner wall and a right inner wall of the structural groove.

10. The turnover assembly according to claim 1, wherein the vertical plate has a structural groove disposed along a length direction of the vertical plate, and the vertical plate is provided with a second reinforcing plate connecting to an inner bottom surface of the structural groove on each of a left inner wall and a right inner wall of the structural groove.

* * * * *